May 16, 1933.  A. O. ABBOTT, JR  1,909,512
METHOD AND APPARATUS FOR MAKING RUBBER ARTICLES
Filed May 7, 1932
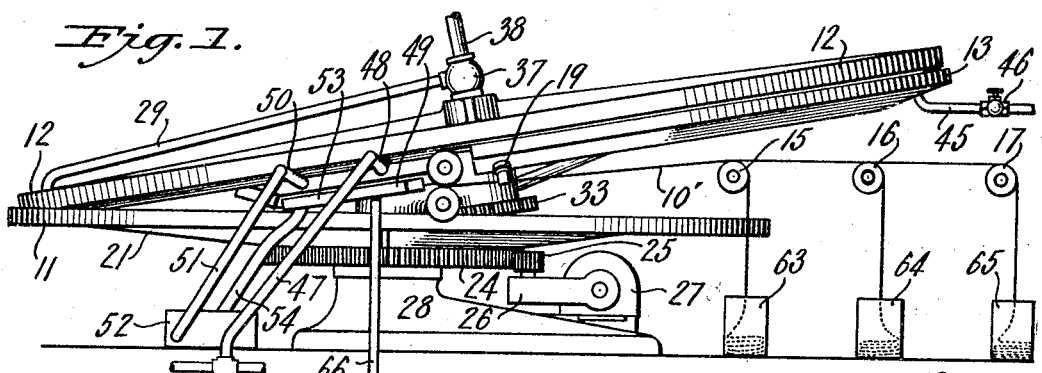
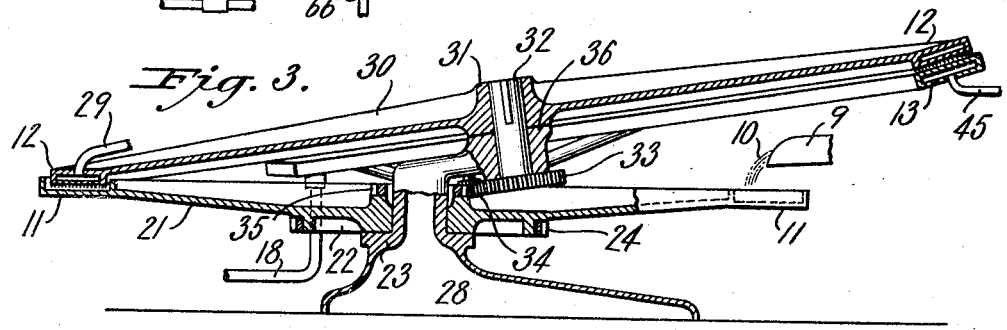
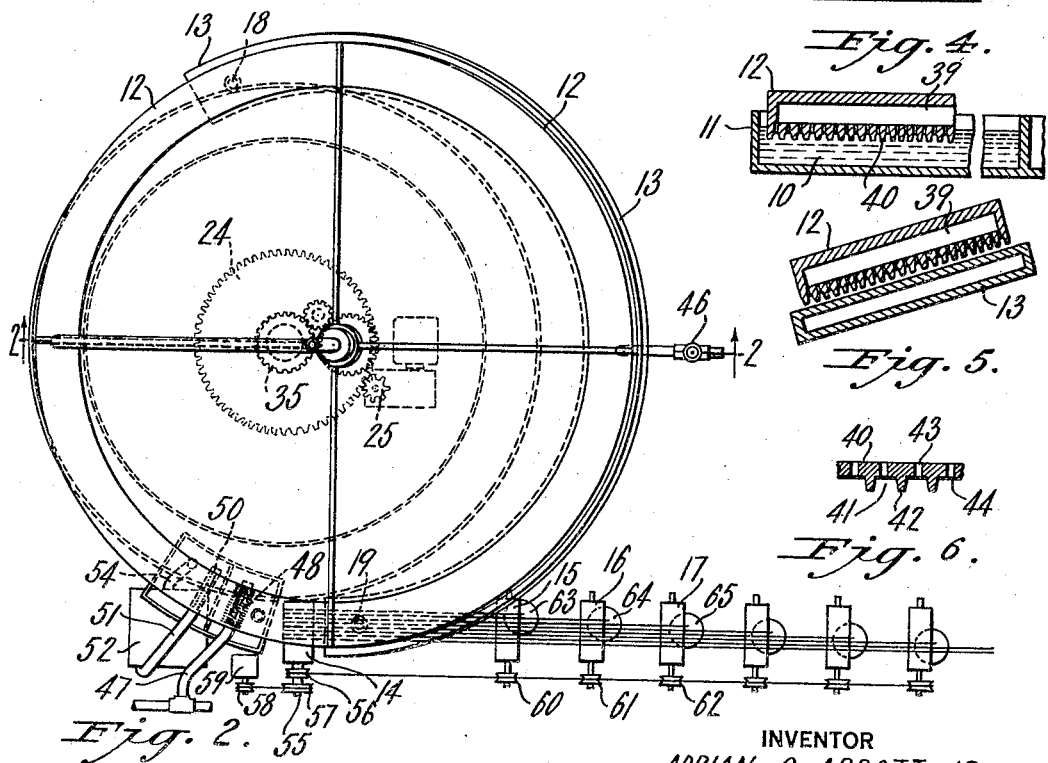
INVENTOR
ADRIAN O. ABBOTT, JR.
BY
ATTORNEY Patented May 16, 1933

1,909,512

UNITED STATES PATENT OFFICE

ADRIAN O. ABBOTT, JR., OF GROSSE POINTE PARK, MICHIGAN, ASSIGNOR TO REVERE RUBBER COMPANY, OF PROVIDENCE, RHODE ISLAND, A CORPORATION OF RHODE ISLAND

METHOD AND APPARATUS FOR MAKING RUBBER ARTICLES

Application filed May 7, 1932. Serial No. 609,834.

This invention relates to the manufacture of rubber goods, particularly rubber goods which are made by the deposition upon a form of rubber solids from an emulsion or dispersion of rubber.

The invention provides an apparatus and process whereby such goods may be made in a simple and economical manner involving an increase in speed of production over those machines and methods customarily used at present.

The invention involves the principle of continuously depositing suspended particles of rubber upon a form at a relatively rapid rate, the deposit being effected while the form and the medium carrying the particles to be deposited are in actual motion but are stationary relative to each other.

The invention may be best understood by reference to the accompanying drawing in which:

Fig. 1 is a side elevation of an apparatus by which the invention may be carried out.

Fig. 2 is a plan view of the same.

Fig. 3 is a sectional view taken along the line 2—2 of Fig. 2.

Fig. 4 is a sectional detail showing the relative positions of the filter chamber and the movable tank associated with the same when the former is immersed in the latter.

Fig. 5 is a sectional detail showing the relative positions of the filter chamber and the drying unit when the former is positioned over the latter.

Fig. 6 is a detail showing the construction of one type of form or filter plate adapted to be used in the practice of the invention as embodied in the illustrative example of this application.

The illustrative embodiment has been chosen as one in which the manufacture of rubber thread is contemplated. Such thread may of course be made from various fluid media carrying suspended rubber solids with or without rubber compounding ingredients. The particular example, however, is described as depicting such manufacture with the use of rubber latex suitably compounded as a vulcanizable latex and compounded with substances which make it adaptable for filtration. Generally stated these substances embrace gel-forming colloids, buffer solutions which influence the degree of aggregation of the particles of rubber by control of their hydrogen ion concentration, substances liberating metallic ions, and vulcanized latex brought about by the incorporation of accelerating substances capable of effecting vulcanization at temperatures preferably below those employed in hot vulcanizing methods. Such substances so generally referred to have been disclosed in the patent to Hopkinson and Gibbons No. 1,632,759 granted June 14, 1927. Latex so compounded is particularly adapted to this invention as its use furthers the rapidity of production of rubber articles by enabling them to be quickly dried after their formation by the deposition of rubber particles on a filter plate or form.

While, therefore, latex is hereinafter referred to as particularly embracing latices compounded as above described, it is to be understood that other types of aqueous dispersions of rubber or other types of emulsions or suspensions may likewise be adapted to practice of the invention as herein described.

Broadly, the invention may be described as involving a process and apparatus in which a quantity of latex 10 is supplied through a suitable source 9 to an annular rotatable tank 11 over which is arranged a rotatable annular filter chamber 12 mounted on an axis which is at an angle to the axis of the tank so that it will dip into the tank during its rotation. The two chambers are rotated so that their peripheries are moving at approximately the same speed and suction applied to the inside of the filter chamber 12. This causes the deposition of rubber solids on the filter plate 40, which for rubber thread comprises a series of annular channels or grooves. After the deposit has been effected the annular filter chamber 12 continues to rotate so that the deposit on the filter plate 40 is brought over the drying chamber 13 which extends around and underneath a considerable portion of the periphery of the chamber 12. A suitable source of heat such as steam is supplied to the drying chamber 13 so that the deposit upon the filter plate may be dried and at least partially vulcanized during its travel over the drying chamber. When the drying is substantially completed, the rubber filaments or threads are stripped from the filter by roll 14 and turned over rolls 15, 16 and 17 into containers or other collecting means suitably disposed underneath the rolls. In this manner rubber thread may be made continuously at a rate of speed appreciably greater than is possible by the use of apparatus heretofore known. It can be seen that this continuous production is obtained by the utilization of the moving filter whose capacity to cause a deposit is not reduced by any appreciable relative movement between the filter and the media containing the particles to be deposited.

Rotation of the annular tank 11 is accomplished by supporting it on a suitable frame 21 whose hub 22 is mounted in bearings 23 on a suitable base 28. A ring gear 24 is fixed to the hub and connected through pinion 25 to reduction gear 26 which reduces the speed of the shaft which supplies power from motor 27.

The motion of the rotatable filter chamber 12 is accomplished by supporting said chamber upon an annular frame 30 having a hub portion 31 keyed to shaft 32 which is journaled in bearings 36 mounted in an extended and offset portion of frame 28, as indicated in Figs. 1 and 3. To one end of shaft 32 is keyed gear 33 which meshes with idler 34 which in turn meshes with ring gear 35 fixed to the hub 22. Rotation of the hub 22 by the means previously described thus effects rotations of the filter chamber which, as is apparent from an inspection of the drawing, is mounted at an angle with the annular tank so that a portion only of its periphery dips into the tank.

The filter chamber 12 is preferably arranged to communicate with a source of reduced pressure in order to facilitate the deposit of rubber solids and remove the aqueous phase of the dispersion. This may be accomplished by conduit 29 which communicates with a rotary coupling 37 mounted at the other end of shaft 32. Into this coupling is led pipe 38 which leads to the source of reduced pressure.

The filter chamber 12, as seen in Figs. 4 and 6, may be formed with a rectangular cross section having an inner space 39 adapted to enable the reduced pressure, which is preferably used in accomplishing the invention, to be communicated with the filter plate 40. This filter plate comprises a large number of annular channels or grooves 41 arranged between annular ribs 42, said grooves communicating with the space 39 through one or more apertures 43. Disposed at the bottom of the grooves and covering the apertures 43 or a reticulated structure disposed over the said apertures, is filtering medium 44 such as the ordinary clay slip or whiting, in order to provide a smooth porous base upon which the rubber deposit may be evenly accumulated. This may be supplied as hereinafter described. The filtering medium may be felt or any suitable material facilitating the filtration of the liquid phase of the dispersion into the inner space 39. The filter chamber may be provided with overflows arranged to allow excess dispersion to fall into a drop pan disposed around and underneath chamber 12. These details, however, are not shown on the drawing in order that the essential features be not obscured.

The drying or curing chamber 13 is disposed underneath the filtering chamber 12 throughout a large part of its circumference as indicated in Figs. 1, 2 and 3. This chamber may be communicated with a source of heat, such as steam, through line 45 in which a control valve 46 may be arranged. Suitable discharge valves 18 and 19 are also provided in chamber 13.

After the rotating filter chamber has passed over the drying chamber 13, it may be desirable to remove some of the clay slip and associated latex serum which slip has been previously applied to grooves 41. For this purpose a brush or other suitable removing means 48 may be provided and a stream of water may be arranged to assist the action of the brush in removing this matter, such stream being supplied for instance through a conduit 47 leading to the brush support from a source of water supply. After the slip and serum ingredients have been removed they drop into a pan 49 from which they may be drained through drain 66.

In order to apply clay slip to the grooves preparatory to their immersion in the tank 11, a spraying device 50 may be arranged to supply such slip, as by suitable pumping means, through line 51 from container 52 in which a suitable supply of slip in liquid form is stored. Any excess is caught in pan 53 and runs back into the source of supply through drain 54.

The roller 14 for removing the films of coagulated and partly vulcanized rubber may be supported on shaft 55 to which is keyed pulleys 56 and 57. Rotation of the drum 14 may be had by connecting pulleys 57, as by a belt, to a pulley 58 which is disposed on a shaft rotated by power means 59. This motion may be transmitted to guide drums 15, 16 and 17 through a belt running from pulley 56 to pulleys 60, 61 and 62. After passing over the guide drums 15, 16 and 17 the rubber filaments may be run into containers 63, 64 and 65 preparatory to further handling or shipment, or they may be wound on spools or formed into hanks as is familiar to those skilled in the art.

In operating the machine the power means 27 and 59 are set in operation, suction supplied through rotary coupling 37, heat supplied to the curing chamber 13 and the clay slip spray set in operation to supply slip to the grooves 41 of the filter plate. The tank and filtering chamber are rotated at a peripheral speed of around 10 feet per minute and by virtue of their rotation at substantially the same speed the latex is drawn into the forms provided in the filter plate and rubber solids deposited under relatively stationary conditions. The deposit so effected is carried over the curing chamber 13 where the rubber is coagulated and vulcanization commenced. As previously indicated, the coagulated filaments are led over drum 14 and back over guide drums 15, 16 and 17 which guide each of the filaments into a container.

The capacity of a machine constructed according to the principles described herein may of course be varied, but without increasing the size to too great an extent it is possible to construct filter plate 40 with one to two hundred grooves in which relatively small rubber filaments may be deposited. At a speed of 10 feet per minute a production of 1000 to 2000 feet of filament may be easily obtained.

Various advantages result in a manufacturing procedure based on the principles described herein. As compared, for instance, with former methods of cutting threads from large sheets it is apparent that the present invention manifests marked superiority over such methods in enabling smoother and smaller threads to be made at greatly increased rates of production.

While the invention has been described with particular reference to rubber filaments or threads, it is to be understood that other articles such as rubber bands, finger cots, gloves, etc. may also be made without departing from the principles herein set forth.

Having thus described my invention, what I claim and desire to protect by Letters Patent is:

1. An apparatus for making rubber articles which comprises in combination a porous form, a tank for holding a medium for carrying solid particles in suspension, means for continuously moving said form into said tank, means for moving said tank at substantially the same speed as that of the form, means for evacuating said form to cause solid particles to be deposited thereon, means for drying said deposit and means for removing the same.

2. An apparatus for making rubber articles which comprises in combination a porous form, a tank for holding a medium for carrying solid particles in suspension, means for continuously moving said form into said tank, means for moving said tank at substantially the same speed as that of the form, means for evacuating said form to cause solid particles to be deposited thereon and means for drying said deposit.

3. An apparatus for making rubber articles which comprises in combination a porous form, a tank for holding a medium for carrying solid particles is suspension, means for continuously moving said form into said tank, means for moving said tank at substantially the same speed as that of the form, and means for evacuating said form.

4. An apparatus for making articles by depositing suspended solid particles on a form comprising in combination means for carrying the medium in which such particles are suspended, means for carrying a porous form, means for moving said first and second mentioned means while maintaining them stationary relative to one another, means for causing said form-carrying means to be brought in close proximity to said medium carrying means, and means connected with said form carrying means to cause a differential of pressure between the inside and outside of said form.

5. An apparatus for making articles by deposition which comprises in combination a porous form, a tank, means for moving said form and tank while maintaining them relatively stationary, means for guiding said form into said tank during a portion of its travel, and means for evacuating said form.

6. An apparatus for making articles by deposition which comprises in combination a porous form, a tank, means for moving said form and tank while maintaining them relatively stationary, and means for guiding said form into said tank during a portion of its travel.

7. The method of making rubber filaments or threads which comprises continuously coating a reticulated groove with a porous filtering medium, continuously depositing rubber from aqueous dispersion upon said medium and in said groove while maintaining the groove and rubber dispersion substantially stationary relative to one another, continuously drying said deposit and removing the same.

8. The method of making rubber filaments or thread comprising continuously moving a plurality of porous grooves into a body of latex while maintaining said grooves and latex relatively stationary, depositing rubber solids from the latex in said grooves and then drying and vulcanizing said deposits.

9. The method of making rubber filaments or thread comprising continuously moving a porous groove into an aqueous dispersion of rubber while maintaining said groove and said dispersion relatively stationary, depositing rubber solids from such dispersion in said groove and subsequently drying and removing said deposit.

10. The method of making rubber filaments or threads which comprises maintaining a porous groove and an aqueous dispersion of rubber stationary with relation to each other while causing said groove to be immersed in said dispersion, depositing rubber from such dispersion in said groove and drying and removing said deposit.

11. The method of making rubber filaments or threads comprising continuously moving a porous groove through a body of latex, maintaining said body in a state of movement substantially the same as that of the continuously moving groove, and drying and removing said deposit.

12. The method of making rubber filaments or thread comprising continuously depositing rubber particles from an aqueous dispersion of rubber in a porous groove, and drying and removing said deposit.

13. The method of making rubber filaments or thread comprising continuously depositing rubber particles from an aqueous dispersion of rubber in a porous groove.

14. The method of making rubber articles comprising continuously moving a form through an aqueous dispersion of rubber while maintaining said form and said dispersion stationary relative to each other.

Signed at Detroit, county of Wayne, State of Michigan, this 3rd day of May, 1932.

ADRIAN O. ABBOTT, Jr.